US012811897B2

(12) United States Patent
Mutter et al.

(10) Patent No.: US 12,811,897 B2
(45) Date of Patent: Nov. 24, 2026

(54) METHOD AND DEVICE FOR PROCESSING DATA ASSOCIATED WITH A DATA FRAME

(71) Applicant: Robert Bosch GmbH, Stuttgart (DE)

(72) Inventors: Arthur Mutter, Neuhausen (DE); Friedrich Wiemer, Burgstetten (DE); Ramona Jung, Stuttgart (DE); Thomas Enderle, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 89 days.

(21) Appl. No.: 18/607,284

(22) Filed: Mar. 15, 2024

(65) Prior Publication Data

US 2024/0333665 A1 Oct. 3, 2024

(30) Foreign Application Priority Data

Mar. 28, 2023 (DE) ..................... 10 2023 202 809.3

(51) Int. Cl.

| | |
|---|---|
| ***G06F 15/16*** | (2006.01) |
| ***H03M 13/00*** | (2006.01) |
| ***H04L 9/40*** | (2022.01) |
| ***H04L 12/40*** | (2006.01) |
| ***H04L 49/901*** | (2022.01) |

(52) U.S. Cl.

CPC ...... *H04L 49/901* (2013.01); *H03M 13/6318* (2013.01); *H04L 12/4013* (2013.01); *H04L 63/0428* (2013.01); *H04L 2012/40215* (2013.01)

(58) Field of Classification Search

CPC ............... H04L 49/901; H04L 12/4013; H04L 63/0428; H04L 2012/4021; H04L 1/0008; H04L 12/40136; H04L 63/123; H03M 13/6318

See application file for complete search history.

(56) References Cited

U.S. PATENT DOCUMENTS

| | | | | |
|---|---|---|---|---|
| 9,806,851 | B2 * | 10/2017 | Shin | H04N 19/70 |
| 2009/0105846 | A1 * | 4/2009 | Hesse | G05B 15/02 717/173 |
| 2018/0148006 | A1 * | 5/2018 | Haga | H04L 12/4625 |
| 2022/0046114 | A1 * | 2/2022 | Entelis | H04L 69/04 |

OTHER PUBLICATIONS

ISO 11898-1:2015 Standard, "Road Vehicles—Controller Area Network (CAN) -Part 1: Data Link Layer and Physical Signalling," 2015, pp. 1-74.

* cited by examiner

*Primary Examiner* — Phuoc H Nguyen
(74) *Attorney, Agent, or Firm* — NORTON ROSE FULBRIGHT US LLP

(57) ABSTRACT

A method for processing data associated with a data frame. The method includes: providing output data with a plurality of information elements, for example in the form of a bit vector, for example for a device for executing cryptographic functions, wherein a first information element of the plurality of information elements has a length of 11 bits and characterizes first identification information associated with a data frame, wherein a second information element of the plurality of information elements has a length of 18 bits and is designed to characterize optional second identification information associated with the data frame, and, optionally, using the output data.

17 Claims, 10 Drawing Sheets

METHOD AND DEVICE FOR PROCESSING DATA ASSOCIATED WITH A DATA FRAME

CROSS REFERENCE

The present application claims the benefit under 35 U.S.C. § 119 of German Patent Application No. DE 10 2023 202 809.3 filed on Mar. 28, 2023, which is expressly incorporated herein by reference in its entirety.

FIELD

The present invention relates to a method for processing data associated with a data frame.

The present invention further relates to a device for processing data associated with a data frame.

SUMMARY

Exemplary embodiments of the present invention relate to a method, for example a computer-implemented method, for processing data associated with a data frame that can be transmitted and/or has been transmitted via a bus system, comprising: providing output data with a plurality of information elements, for example in the form of a bit vector, for example for a device for executing cryptographic functions, wherein a first information element of the plurality of information elements has a length of 11 bits and characterizes first identification information associated with a data frame, wherein a second information element of the plurality of information elements has a length of 18 bits and is designed to characterize optional second identification information associated with the data frame, and, optionally, using the output data. In further exemplary embodiments, this makes it possible to provide the output data, for example flexibly, for example for (for example further) processing by the device for executing cryptographic functions, for example for decrypting and/or checking an authenticity or integrity of data associated with the data frame.

In further exemplary embodiments of the present invention, the output data can be formed, for example, on the basis of a data frame transferred via the bus system and received by a bus device.

In further exemplary embodiments of the present invention, the received data frame can be stored, for example at least temporarily, for example buffered, for example in a receive buffer associated with the receiving bus device. For example, in this way, for example the first identification information and/or the second identification information and/or further information possibly present in the received data frame can be stored at least temporarily.

In further exemplary embodiments of the present invention, the output data can be formed, for example, on the basis of the first and second identification information and, optionally, on the basis of at least a part of the further information possibly present in the received data frame, such as can be stored, for example, at least temporarily in the receive buffer.

In further exemplary embodiments of the present invention, it is provided that the data frame is an LLC (link layer control) data frame according to the CAN FD (controller area network flexible data rate) protocol, for example according to ISO 11898-1:2015.

In further exemplary embodiments of the present invention, the CAN FD LLC data frame can be derived, for example, from a data frame such as is used in a CAN FD bus system for transmission via the bus system. For example, the CAN FD LLC data frame can comprise a subset of and/or other and/or additional information as compared to a data frame which is used in the CAN FD bus system and is associated, for example, with a deeper protocol layer, e.g., the MAC (medium access control) layer, for example layer 2a according to the ISO/OSI model. For example, the CAN FD LLC data frame is associated with layer 2b of the ISO/OSI model.

In further exemplary embodiments of the present invention, it is provided that the method comprises at least one of the following elements: a) assigning the value zero, for example binary "000000000000000000", to the second information element, for example when the data frame has a CAN FD base data frame format, for example FDBF, for example flexible data rate base frame format, for example having an identification having 11 bits; b) assigning a non-vanishing value, for example non-vanishing binary value, for example on the basis of an identification extension of the data frame, to the second information element, for example when the data frame has a CAN FD extended data frame format, for example FDEF, for example flexible data rate extended frame format, for example having an identification having 29 bits. In other words, in further exemplary embodiments, the second information element can thus be regarded, for example, as a placeholder which, in the case of a 29-bit identification, offers memory space for this 29-bit identification but which, in the case of an 11-bit identification, for example, is unused.

In further exemplary embodiments of the present invention, it is provided that the method comprises at least one of the following elements: a) providing the first information element in the first 11 bits of the bit vector, for example from bit 0 to bit 10; b) providing a third information element having three bits, which characterizes a format of the data frame, in bit 11 to bit 13 of the bit vector; c) providing the second information element in bit 14 to bit 31 of the bit vector.

In further exemplary embodiments of the present invention, it is provided that the method comprises at least one of the following elements: a) providing filler data, for example padding data, in bit 32 to bit 38 of the bit vector; b) providing an information element, for example a DLC (data length code) information element, which characterizes a length of data bytes of the data frame, for example in bit 33 to bit 42 of the bit vector; c) providing an information element, for example a BRS (bit rate switch) information element, which characterizes a switching of a data rate, for example within the data frame, for example in bit 43 of the bit vector; d) providing filler data in bit 44 to bit 63 of the bit vector. In further exemplary embodiments, the filler data can effect, for example, an alignment of other information elements of the bit vector, for example, at data word boundaries.

In further exemplary embodiments of the present invention, it is provided that the method comprises at least one of the following elements: a) providing an information element, for example a BRS (bit rate switch) information element, which characterizes a switching of a data rate, for example within the data frame, for example in bit 32 of the bit vector; b) providing an information element, for example a DLC (data length code) information element, which characterizes a length of data bytes of the data frame, for example in bit 33 to bit 36 of the bit vector; c) providing filler data in bit 37 to bit 63 of the bit vector.

In further exemplary embodiments of the present invention, it is provided that the method comprises at least one of the following elements: a) providing the first information element in the first 11 bits of the bit vector, for example from bit 0 to bit 10; b) providing a third information element having three bits, which characterizes a format of the data frame, in bit 11 to bit 13 of the bit vector; c) providing the second information element in bit 46 to bit 63 of the bit vector.

In further exemplary embodiments of the present invention, it is provided that the method comprises at least one of the following elements: a) providing filler data in bit 14 to bit 30 of the bit vector; b) providing an information element, for example a DLC (data length code) information element, which characterizes a length of data bytes of the data frame, for example in bit 31 to bit 34 of the bit vector; c) providing an information element, for example a BRS (bit rate switch) information element, which characterizes a switching of a data rate, for example within the data frame, for example in bit 35 of the bit vector; d) providing filler data in bit 36 to bit 45 of the bit vector.

In further exemplary embodiments of the present invention, it is provided that the method comprises at least one of the following elements: a) providing, for example, 32-bit filler data in bit 64 to bit 95 of the bit vector, for example in a third 32-bit data word of the bit vector; b) providing filler data having, for example, 27 bits, wherein b1) the, for example, 27-bit filler data extend, for example, from bit 32 to bit 38 and from bit 44 to bit 63, or wherein b2) the, for example, 27-bit filler data extend, for example, from bit 37 to bit 63, or wherein b3) the, for example, 27-bit filler data extend, for example, from bit 14 to bit 30 and from bit 36 to bit 45.

In further exemplary embodiments of the present invention, it is provided that the method comprises: providing one or more information elements for a security protocol associated with, for example, the data frame, for example of the CANsec type, for example according to the CiA (CAN in Automation) 613-2 specification, for example from bit 64 or from bit 96 of the bit vector. In further exemplary embodiments, data associated with the security protocol can be processed, for example, by the device for executing cryptographic functions.

In further exemplary embodiments of the present invention, a combination of the above-mentioned 32-bit filler data in the third data word with the 27-bit filler data for the first and/or second data words is advantageous since, for example, an alignment of the optional information elements for the CANsec protocol can thereby be achieved in the output data, for example, in the bit vector, such as can, for example, also be provided in CAN XL LLC data frames for a use of the CANsec protocol. This simplifies the processing of the bit vector, wherein, for example, no distinction needs to be made in a device processing the bit vector (for example, device for executing cryptographic functions) as to whether it is a CAN FD-based data frame or an input vector associated with a CAN FD-based data frame or a CAN XL-based data frame or an input vector associated with a CAN XL-based data frame. It is rather the case that information relating to the CANsec protocol is supplied to the device processing the bit vector at the same bit location of the input vector.

In further exemplary embodiments of the present invention, it is provided that the method comprises: providing a checksum, for example of the ICV (integrity check value) type, for example at the end of the bit vector. For example, the bit vector has a length from 24 bytes to, for example, approximately 100 bytes, and information of the checksum can, for example, occupy the last bytes, for example the last 4 bytes or 8 bytes or 12 bytes or 16 bytes.

In further exemplary embodiments of the present invention, it is provided that the method comprises: truncating a checksum, for example of the ICV type, wherein, for example, a truncated checksum is obtained, and, optionally, providing the truncated checksum, for example at the end of the bit vector.

In further exemplary embodiments of the present invention, it is provided that truncating the checksum comprises truncating the checksum to a length which is an integer multiple of 8 bits, for example to a length of 32 bits or 40 bits or 48 bits or 56 bits or 64 bits, etc.

In further exemplary embodiments of the present invention, for example alternatively to or in addition to the use of a (for example, truncated) checksum, further optional measures for increasing security can be taken, for example against falsification of the data frame and/or for detecting attacks.

Further exemplary embodiments of the present invention relate to a device for performing the method according to the embodiments.

Further exemplary embodiments of the present invention relate to a bus device for a bus system, for example of the CAN FD type, comprising at least one device according to the embodiments. In further exemplary embodiments, the bus device can be designed to process, at least, for example, selectively, data frames of the CAN FD type as well as data frames of the CAN XL type.

Further exemplary embodiments of the present invention relate to a computer-readable storage medium comprising commands that, when executed by a computer, cause said computer to perform the method according to the embodiments.

Further preferred embodiments of the present invention relate to a computer program comprising commands that, when the program is executed by a computer, cause said computer to perform the method according to the embodiments.

Further exemplary embodiments of the present invention relate to a data carrier signal that transmits and/or characterizes the computer program according to the embodiments.

Further exemplary embodiments of the present invention relate to a use of the method according to the embodiments and/or of the device according to the embodiments and/or of the bus device according to the embodiments and/or of the computer-readable storage medium according to the embodiments and/or of the computer program according to the embodiments and/or of the data carrier signal according to the embodiments for at least one of the following elements: a) providing output data with a plurality of information elements, for example in the form of a bit vector, for a device for executing cryptographic functions; b) making possible an efficient use of the CANsec protocol for CAN FD; c) optimizing a data format for an input vector for a device for executing cryptographic functions; d) making possible a truncation of a checksum, for example for CAN FD, for example to a length of less than 64 bits; e) making possible a, for example efficient, use of the CANsec protocol selectively for CAN FD and/or CAN XL; f) making possible a, for example efficient, processing of different CAN FD identifier lengths of, for example, 11 bits and 29 bits; g) converting, for example flexibly converting, data associated with the data frame into at least one input bit vector for a device for executing cryptographic functions.

Further features, possible applications and advantages of the present invention will be apparent from the following description of exemplary embodiments of the present invention shown in the figures. In this case, all of the features described or shown form the subject matter of the present invention individually or in any combination, irrespective of their combination, their wording, or representation in the description or in the figures.

DETAILED DESCRIPTION OF EXAMPLE EMBODIMENTS

Figure 1:
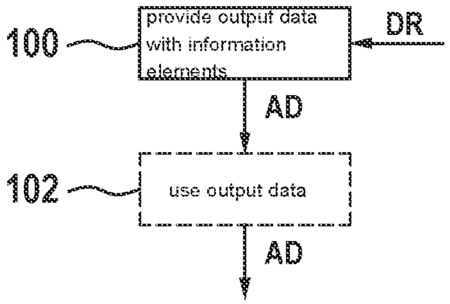
FIG. 1 schematically shows a simplified flowchart according to exemplary embodiments of the present invention.
Figure 2:
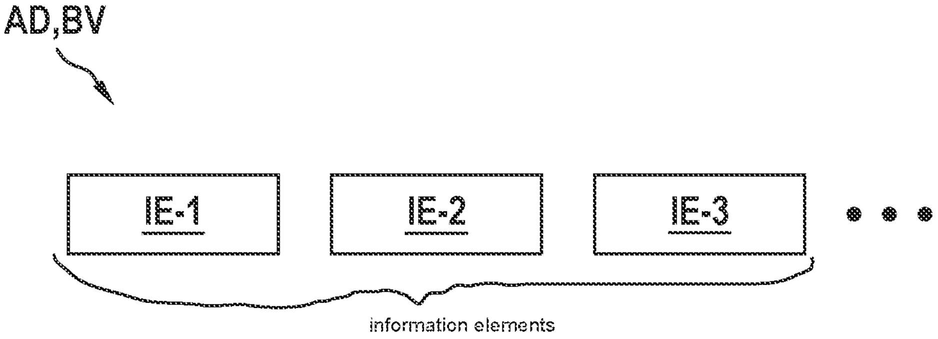
FIG. 2 schematically shows a simplified block diagram according to exemplary embodiments of the present invention.
Figure 3:
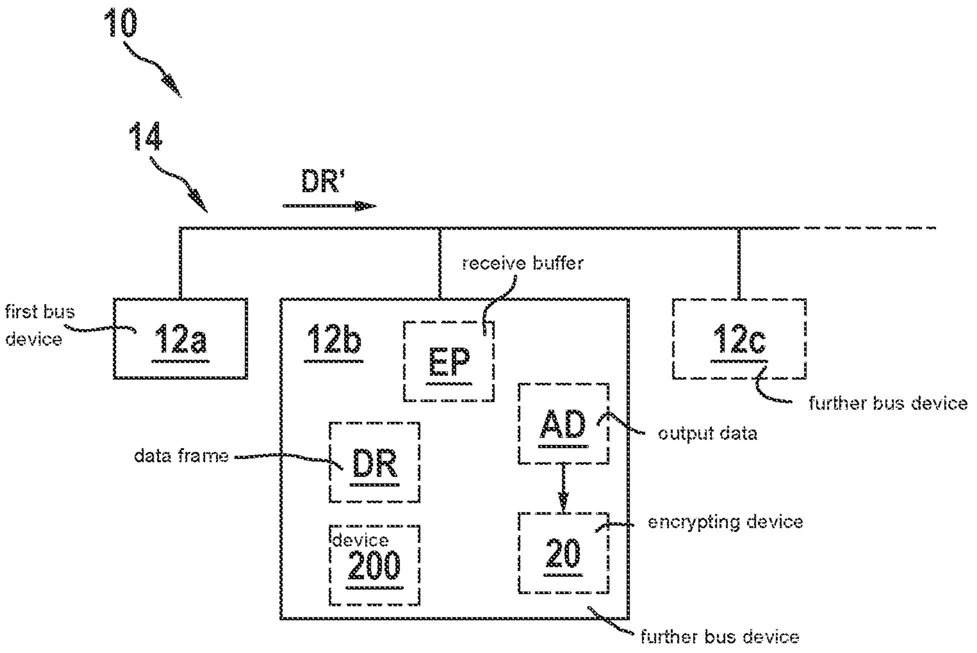
FIG. 3 schematically shows a simplified block diagram according to exemplary embodiments of the present invention.

Exemplary embodiments, see, for example, FIG. 1, 2, 3, relate to a method, for example a computer-implemented method, for processing data associated with a data frame DR' that can be transmitted and/or has been transmitted via a bus system 10 (FIG. 3), comprising: providing 100 (FIG. 1) output data AD (FIG. 2) with a plurality of information elements IE-1, IE-2, . . . , for example in the form of a bit vector BV, for example for a device 20 (FIG. 3) for executing cryptographic functions, wherein a first information element IE-1 (FIG. 2) of the plurality of information elements has a length of 11 bits and characterizes first identification information associated with a data frame DR, DR', wherein a second information element IE-2 of the plurality of information elements has a length of 18 bits and is designed to characterize optional second identification information associated with the data frame DR, DR', and, optionally, using 102 (FIG. 1) the output data AD. In further exemplary embodiments, this makes it possible to provide the output data AD, for example flexibly, for example for (for example further) processing by the device 20 for executing cryptographic functions, for example for decrypting and/or checking an authenticity or integrity of data associated with the data frame DR, DR'.

In further exemplary embodiments, FIG. 2, the output data AD can be formed, for example, on the basis of a data frame DR', transferred via the bus system 10 and received by a bus device 12*b*, for example by means of a device 200 for executing aspects according to exemplary embodiments. The data frame DR' can, for example, have been transmitted by a first bus device 12*a*, and can be received, for example, by one or more further bus devices 12*b*, 12*c*, . . . .

In further exemplary embodiments, the device 20 and/or the device 200 can be integrated, for example, into the bus device 12*b*.

In further exemplary embodiments, the provision 100 can, for example, comprise writing the output data AD, for example in the form of the bit vector BV, into a memory to which the device 20 can have at least read access, and/or transferring, for example via a data interface between the device 200 and the device 20. Optionally, in further exemplary embodiments, a shared memory or a shared memory area can, for example, also be provided for providing 100 the output data AD, for example from the device 200 to the device 20.

In further exemplary embodiments, the received data frame DR' can be stored, for example at least temporarily, for example buffered, for example in a receive buffer EP associated with the receiving bus device 12*b*. For example, in this way, for example the first identification information and/or the second identification information and/or further information possibly present in the received data frame DR' can be stored at least temporarily.

In further exemplary embodiments, FIG. 3, the output data AD can be formed, for example, on the basis of the first and second identification information and, optionally, on the basis of at least a part of the further information possibly present in the received data frame DR', such as can be stored, for example, in the receive buffer EP at least temporarily.

In further exemplary embodiments, it is provided that the data frame is an LLC (link layer control) data frame according to the CAN FD (controller area network flexible data rate) protocol, for example according to ISO 11898-1:2015.

In further exemplary embodiments, the CAN FD LLC data frame DR can be derived, for example, from the data frame DR', such as is used in a CAN FD bus system 10 for transmission via the bus system 10. For example, the CAN FD LLC data frame DR can comprise a subset of and/or other and/or additional information as compared to a data frame DR' which is used in the CAN FD bus system 10 and is associated, for example, with a deeper protocol layer, for example the MAC (medium access control) layer, for example layer 2a according to the ISO/OSI model. For example, the CAN FD LLC data frame DR is associated with layer 2b of the ISO/OSI model.

Figure 4:
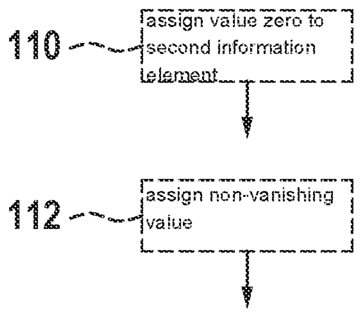
FIG. 4 schematically shows a simplified flowchart according to exemplary embodiments of the present invention.

In further exemplary embodiments, FIG. 4, it is provided that the method comprises at least one of the following elements: a) assigning 110 the value zero, for example binary "000000000000000000" or 000000000000000000b, to the second information element IE-2 (FIG. 2), for example when the data frame DR', DR has a CAN FD base data frame format, for example FDBF, for example flexible data rate base frame format, for example having an identification having 11 bits; b) assigning 112 (FIG. 4) a non-vanishing value, for example non-vanishing binary value, for example on the basis of an identification extension of the data frame DR, DR', to the second information element IE-2, for example when the data frame DR, DR' has a CAN FD extended data frame format, for example FDEF, for example flexible data rate extended frame format, for example having an identification having 29 bits.

Figure 5:
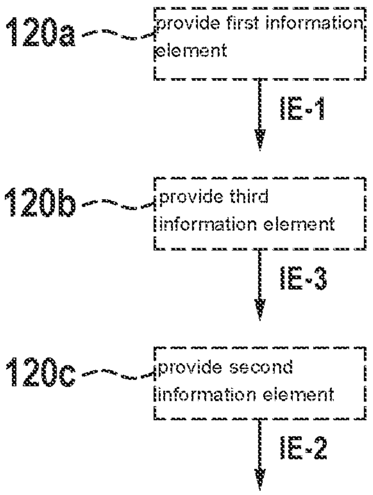
FIG. 5 schematically shows a simplified flowchart according to exemplary embodiments of the present invention.

In further exemplary embodiments, FIG. 5, it is provided that the method comprises at least one of the following elements: a) providing 120*a* the first information element IE-1 in the first 11 bits of the bit vector BV, for example from bit 0 to bit 10; b) providing 120*b* a third information element IE-3 having three bits, which characterizes a format of the data frame DR, in bit 11 to bit 13 of the bit vector BV; c) providing 120*c* the second information element IE-2 in bit 14 to bit 31 of the bit vector BV.

Figure 15:
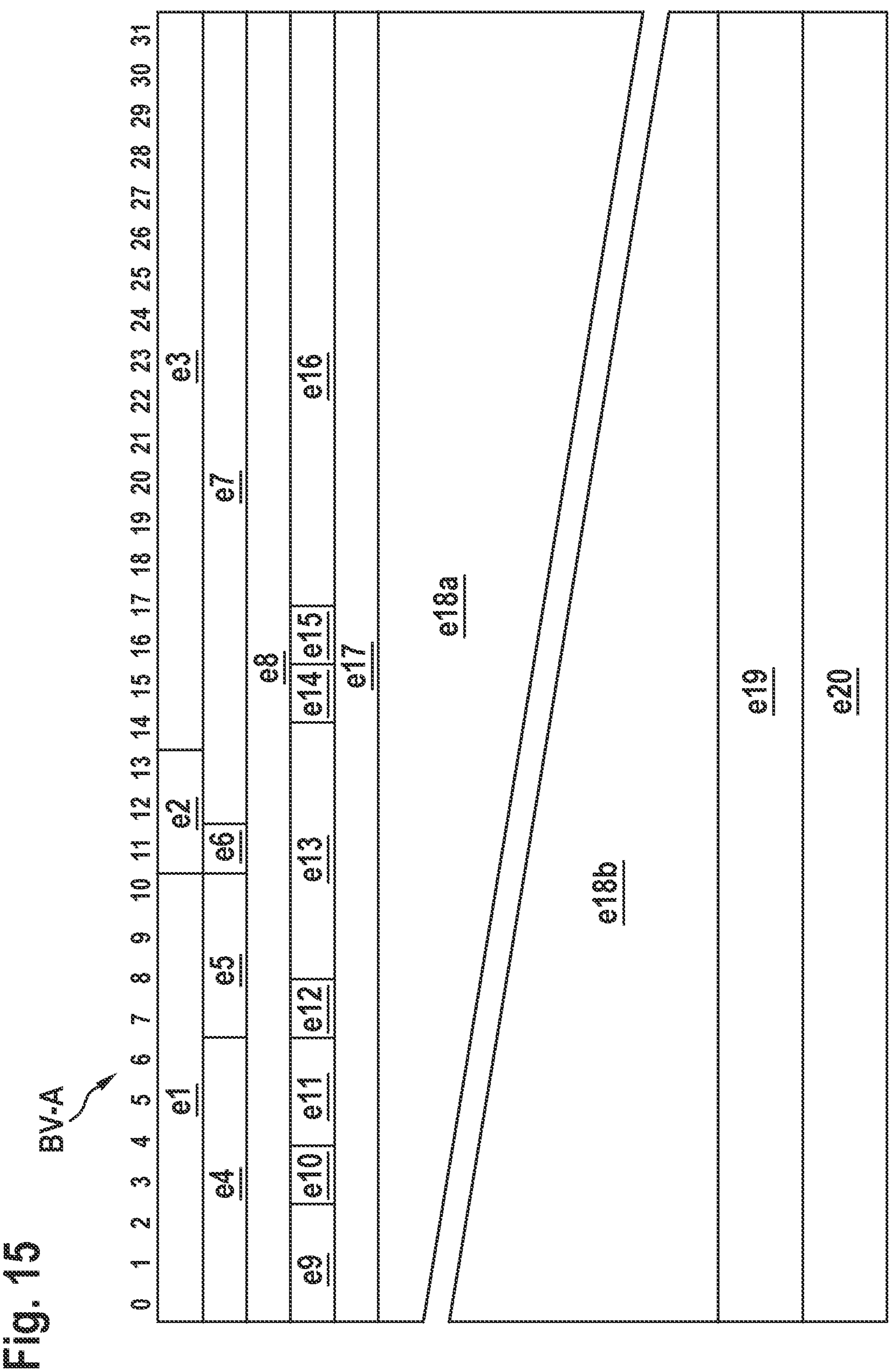
FIG. 15 schematically shows information according to exemplary embodiments of the present invention.

In this respect, FIG. 15 schematically shows, by way of example, a bit vector BV-A of a first type, which can be used, for example, as an input vector VA for the device 20 in further exemplary embodiments. The bit vector BV-A comprises a plurality of data words each 32 bits wide, which data words correspond to individual rows of the diagram in FIG. 15. The digits "0" . . . "31" in the upper region of FIG. 15 symbolize individual bits of the respective data word.

The element e1 of the bit vector BV-A according to FIG. 15 symbolizes, for example, the first information element IE-1 according to FIG. 5, the element e2 of the bit vector BV-A according to FIG. 15 symbolizes, for example, the third information element IE-3 according to FIG. 5, and the element e3 of the bit vector BV-A according to FIG. 15 symbolizes, for example, the second information element IE-2 according to FIG. 5.

Figure 16:
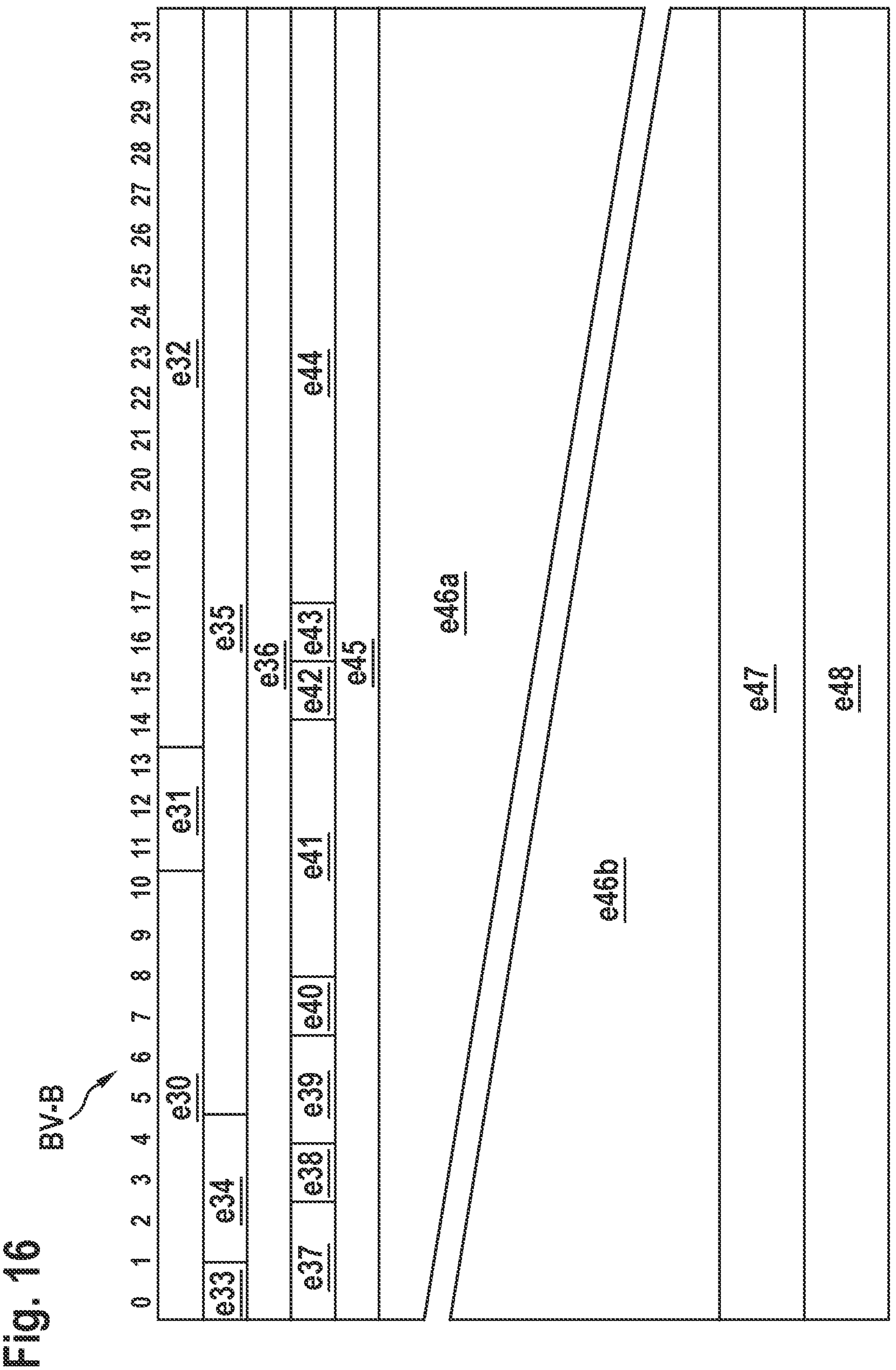
FIG. 16 schematically shows information according to exemplary embodiments of the present invention.

FIG. 16 schematically shows, by way of example, a bit vector BV-B of a second type, which in further exemplary embodiments can be used, for example, as an input vector Ve for the device 20. Similarly to the bit vector BV-A according to FIG. 15, the bit vector BV-B has a plurality of data words each 32 bits wide, which data words correspond to individual rows of the diagram in FIG. 16. The digits "0" . . . "31" in the upper region of FIG. 16 symbolize individual bits of the respective data word.

The element e30 of the bit vector BV-B according to FIG. 16 symbolizes, for example, the first information element IE-1 according to FIG. 5, the element e31 of the bit vector BV-B according to FIG. 16 symbolizes, for example, the third information element IE-3 according to FIG. 5, and the element e32 of the bit vector BV-B according to FIG. 16 symbolizes, for example, the second information element IE-2 according to FIG. 5. Consequently, the structures of the respective first data words of the two bit vectors BV-A, BV-B according to FIG. 15, 16 are therefore identical.

Figure 6:
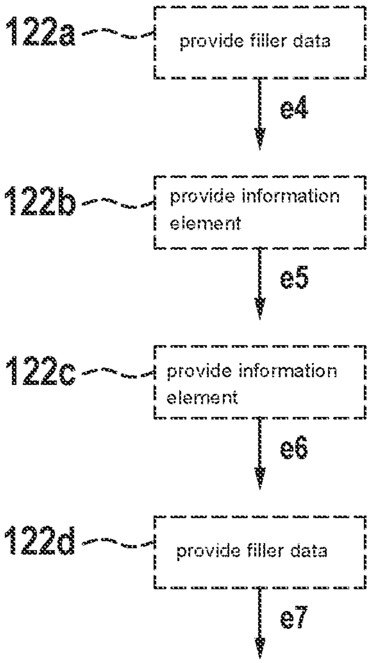
FIG. 6 schematically shows a simplified flowchart according to exemplary embodiments of the present invention.

In further exemplary embodiments, FIG. 6, it is provided that the method comprises at least one of the following elements: a) providing 122*a* filler data e4 (FIG. 15), for example padding data, in bit 32 to bit 38 of the bit vector (or in bits 0 to 6 of a second data word of the bit vector), see, for example, the bit vector BV-A according to FIG. 15; b) providing 122*b* (FIG. 6) an information element e5, for example a DLC (data length code) information element e5, which characterizes a length of data bytes of the data frame DR, for example in bit 33 to bit 42 of the bit vector BV, see, for example, the bit vector BV-A according to FIG. 15; c) providing 122*c* (FIG. 6) an information element e6, for example a BRS (bit rate switch) information element e6, which characterizes a switching of a data rate, for example, within the data frame DR, for example, in bit 43 of the bit vector BV, see, for example, the bit vector BV-A according to FIG. 15; d) providing 122*d* (FIG. 6) filler data e7 in bit 44 to bit 63 of the bit vector BV, see, for example, the bit vector BV-A according to FIG. 15.

Figure 7:
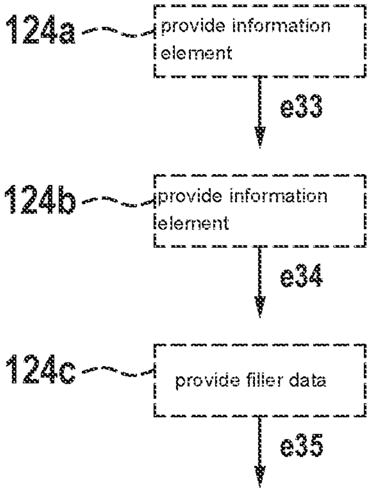
FIG. 7 schematically shows a simplified flowchart according to exemplary embodiments of the present invention.

In further exemplary embodiments, FIG. 7, it is provided that the method comprises at least one of the following elements: a) providing 124*a* an information element e33, for example a BRS (bit rate switch) information element e33, which characterizes a switching of a data rate, for example within the data frame DR, for example in bit 32 of the bit vector BV-B, see FIG. 16; b) providing 124*b* (FIG. 7) an information element e34, for example a DLC (data length code) information element e34, which characterizes a length of data bytes of the data frame DR, for example in bit 33 to bit 36 of the bit vector BV-B; c) providing 124*c* (FIG. 7) filler data in bit 37 to bit 63 of the bit vector BV-B.

Figure 17:
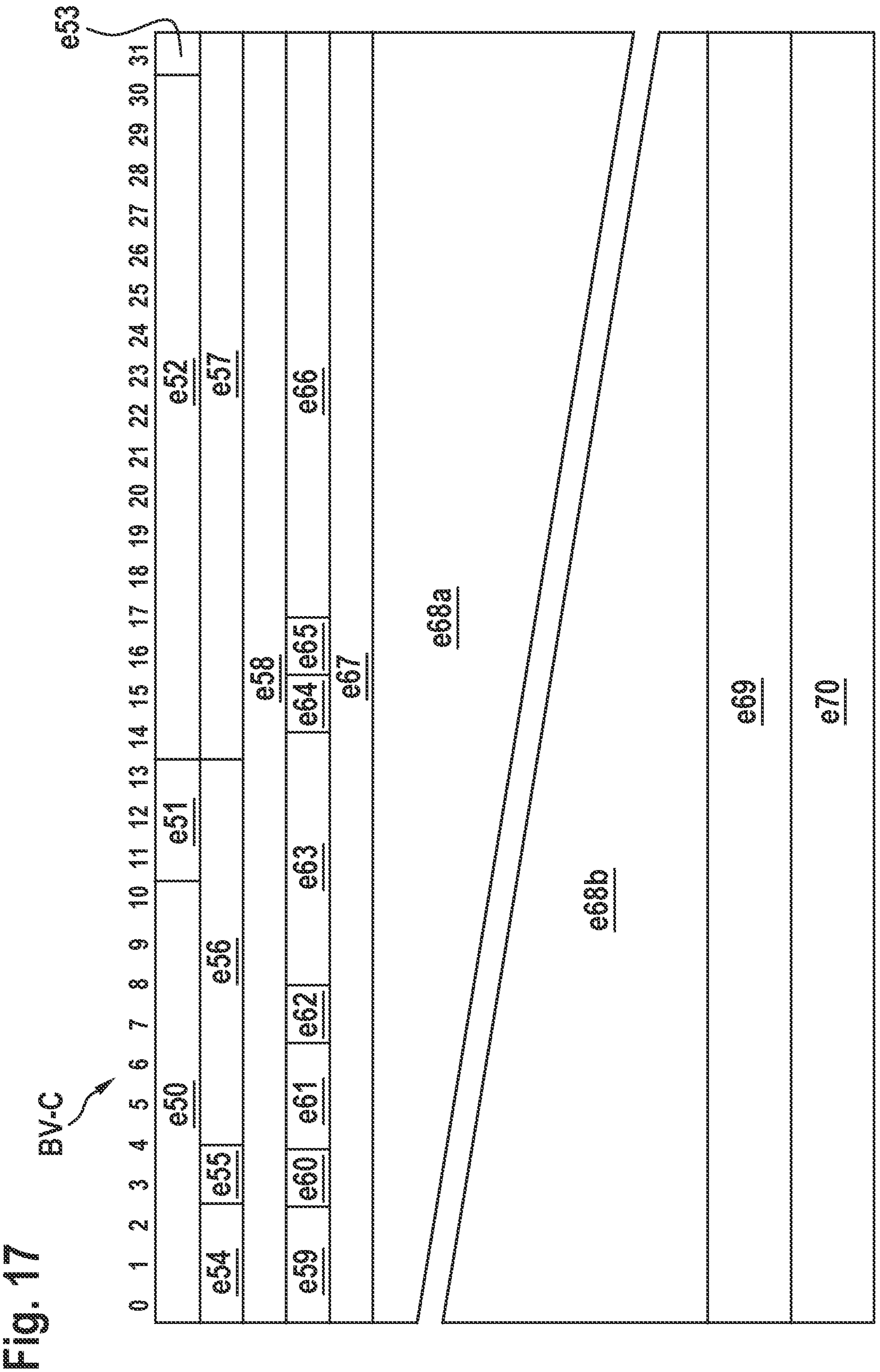
FIG. 17 schematically shows information according to exemplary embodiments of the present invention.

FIG. 17 schematically shows, by way of example, a bit vector BV-C of a third type, which in further exemplary embodiments can be used, for example, as an input vector Vc for the device 20. Similarly to the bit vector BV-A according to FIG. 15, the bit vector BV-C has a plurality of data words each 32 bits wide, which data words correspond to individual rows of the diagram in FIG. 17. The digits "0" . . . "31" in the upper region of FIG. 17 symbolize individual bits of the respective data word.

Figure 8:
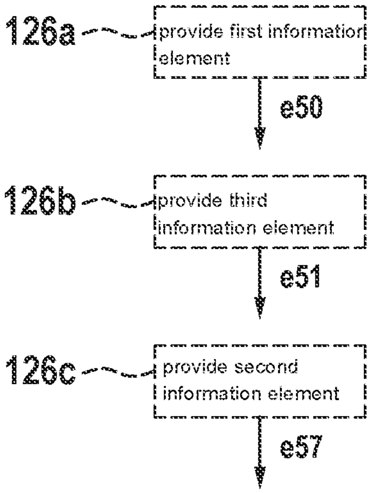
FIG. 8 schematically shows a simplified flowchart according to exemplary embodiments of the present invention.

In further exemplary embodiments, FIG. 8, it is provided that the method comprises at least one of the following elements: a) providing 126*a* the first information element IE-1 in the first 11 bits of the bit vector BV-C, for example from bit 0 to bit 10, see the symbol e50 according to FIG. 17; b) providing 126*b* (FIG. 8) a third information element IE-3 having three bits, which characterizes a format of the data frame DR, in bit 11 to bit 13 of the bit vector BV-C, see the symbol e51 according to FIG. 17; c) providing 126*c* (FIG. 8) the second information element IE-2 in bit 46 to bit 63 of the bit vector BV-C, see the symbol e57 according to FIG. 17.

Figure 9:
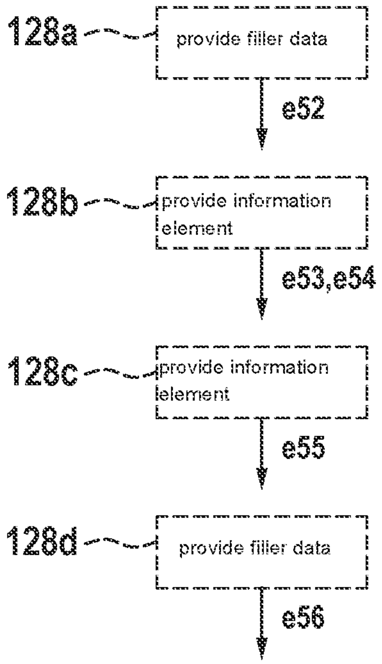
FIG. 9 schematically shows a simplified flowchart according to exemplary embodiments of the present invention.

In further exemplary embodiments, FIG. 9, it is provided that the method has at least one of the following elements: a) providing 128 a filler data e52 in bit 14 to bit 30 of the bit vector BV-C; b) providing 128*b* (FIG. 9) an information element e53, e54, for example a DLC (data length code) information element, which characterizes a length of data bytes of the data frame DR, for example in bit 31 to bit 34 of the bit vector BV-C; c) providing 128*c* (FIG. 9) an information element e55, for example a BRS (bit rate switch) information element, which characterizes a switching of a data rate, for example within the data frame DR, for example in bit 35 of the bit vector BV-C; d) providing 128*d* (FIG. 9) filler data in bit 36 to bit 45 of the bit vector BV-C.

Figure 10:
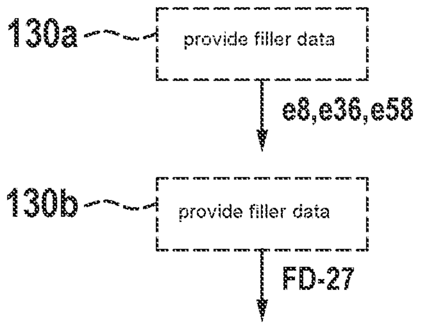
FIG. 10 schematically shows a simplified flowchart according to exemplary embodiments of the present invention.

In further exemplary embodiments, FIG. 10, it is provided that the method comprises at least one of the following elements: a) providing 130*a*, for example, 32-bit filler data in bit 64 to bit 95 of the bit vector BV-A, BV-B, BV-C, for example in a third 32-bit data word of the bit vector BV-A, BV-B, BV-C, see, for example, element E8 in FIG. 15 and/or element e36 in FIG. 16 and/or element e58 in FIG. 17; b) providing 130*b* (FIG. 10), for example, 27-bit filler data, wherein b1) the, for example, 27-bit filler data extend, for example, from bit 32 to bit 38 and from bit 44 to bit 63 (see elements e4 and e7 according to FIG. 15), or wherein b2) the, for example, 27-bit filler data extend, for example, from bit 37 to bit 63 (see element e35 according to FIG. 16), or wherein b3) the, for example, 27-bit filler data extend, for example, from bit 14 to bit 30 and from bit 36 to bit 45 (see elements e52 and e56 according to FIG. 17).

Figure 11:
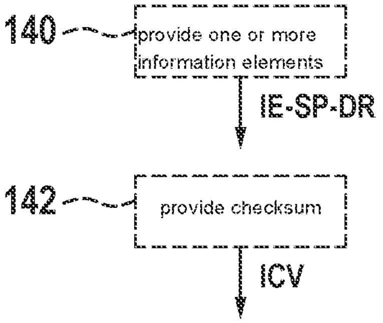
FIG. 11 schematically shows a simplified flowchart according to exemplary embodiments of the present invention.

In further exemplary embodiments, FIG. 11, it is provided that the method comprises: providing 140 one or more information elements IE-SP-DR for a security protocol associated with, for example, the data frame DR, for example of the type CANsec, for example according to the CiA (CAN in Automation) 613-2 specification, for example from bit 64 or from bit 96 of the bit vector, see, for example, the elements e9, e10, e11, e12, e13, e14, e15, e16, e17 from FIG. 15 and/or the elements e37, e38, . . . , e45 from FIG. 16 and/or the elements e59, e60, . . . , e67 from FIG. 17.

In further exemplary embodiments, data associated with the security protocol can be processed, for example, by the device 20 (FIG. 3) for executing cryptographic functions.

In further exemplary embodiments, FIG. 11, it is provided that the method comprises: providing 142 a checksum ICV, for example of the ICV (integrity check value) type, for example at the end of the bit vector BV-A according to FIG. 15, see elements e19, e20, and/or at the end of the bit vector BV-B according to FIG. 16, see elements e47, e48, and/or at the end of the bit vector BV-C according to FIG. 17, see elements e69, e70.

For example, the bit vector BV and/or BV-A and/or BV-B and/or BV-C has a length of, for example, approximately 24 bytes to, for example, approximately 100 bytes, and information of the checksum ICV can, for example, occupy the last bytes, for example the last 4 bytes or 8 bytes or 12 bytes or 16 bytes.

In further exemplary embodiments, useful data (for example, up to 64 bytes) can be arranged in one or more data words between the element e17 (for example, characterizing an optional "freshness" value) and the element e19 in the bit vector BV-A according to FIG. 15, see, for example, the elements e18*a*, e18*b*.

In further exemplary embodiments, useful data (for example, up to 64 bytes) can be arranged in one or more data words between the element e45 (for example, characterizing an optional "freshness" value) and the element e47 in the bit vector BV-B according to FIG. 16, see, for example, the elements e46*a*, e46*b*.

In further exemplary embodiments, useful data (for example, up to 64 bytes) can be arranged in one or more data words between the element e67 (for example, characterizing an optional "freshness" value) and the element e69 in the bit vector BV-C according to FIG. 17, see, for example, the elements e68*a*, e68*b*.

Figure 12:
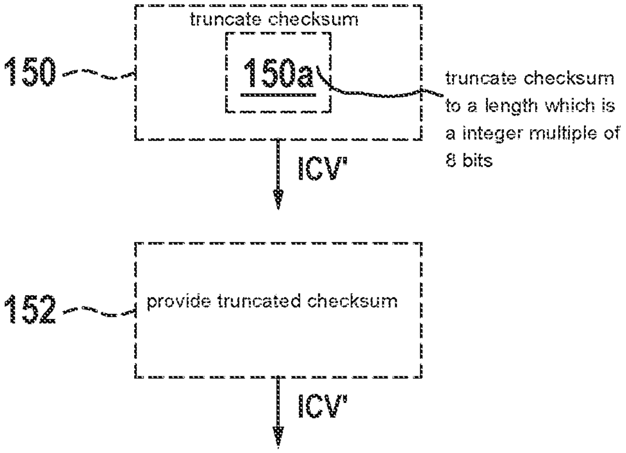
FIG. 12 schematically shows a simplified flowchart according to exemplary embodiments of the present invention.

In further exemplary embodiments, FIG. 12, it is provided that the method comprises: truncating 150 a checksum ICV, for example of the ICV type, wherein, for example, a truncated checksum ICV' is obtained, and, optionally, providing 152 the truncated checksum ICV', for example at the end of the bit vector BV-A, see, for example, the elements e19, e20 according to FIG. 15, and/or at the end of the bit vector BV-B, see, for example, the elements e47, e48 according to FIG. 16 and/or at the end of the bit vector BV-C, see, for example, the elements e69, e70 according to FIG. 17.

In further exemplary embodiments, FIG. 12, it is provided that truncating 150 the checksum ICV comprises truncating 150*a* the checksum ICV to a length which is an integer multiple of 8 bits, for example to a length of 32 bits or 40 bits or 48 bits or 56 bits or 64 bits, etc.

Figure 13:
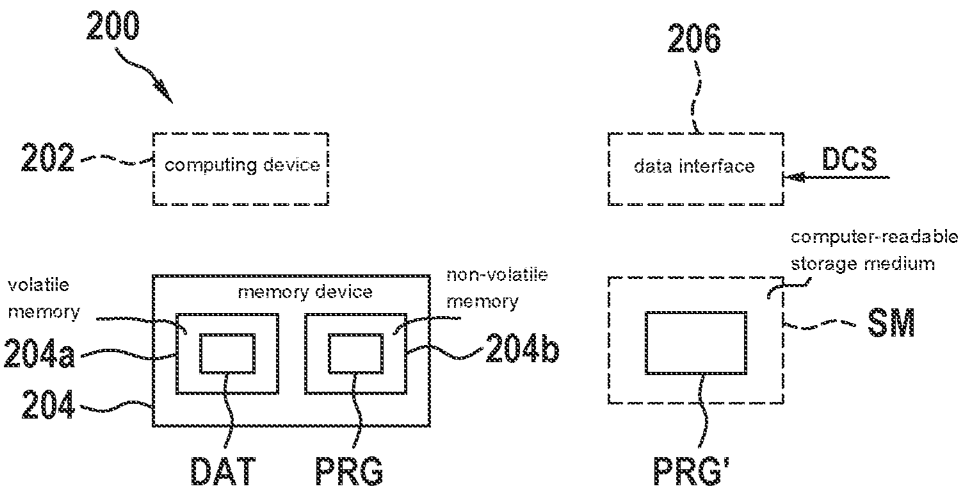
FIG. 13 schematically shows a simplified block diagram according to exemplary embodiments of the present invention.

Further exemplary embodiments, FIG. 13, relate to a device 200 for performing the method according to the embodiments. For example, the device 200 or its functionality can be integrated into at least one bus device 12*b* (FIG. 3) for the bus system 10.

In further exemplary embodiments, FIG. 13, it is provided that the device 200 comprises: a computing device ("computer") 202 having at least one computing core, a memory device 204 associated with the computing device 202, for at least temporarily storing at least one of the following elements: a) data DAT (for example, with the data associated with the data frame(s) DR, DR', and/or data characterizing the bit vector BV or BV-A, or BV-B or BV-C, b) computer program PRG, for example for performing the method according to the embodiments.

In further exemplary embodiments, the memory device 204 has a volatile memory (for example, working memory (RAM)) 204*a*, and/or a non-volatile (NVM) memory (for example, flash EEPROM) 204*b*, or a combination thereof or with other types of memory not explicitly mentioned.

Further exemplary embodiments relate to a computer-readable storage medium SM comprising commands PRG' that, when executed by a computer 202, cause said computer to perform the method according to the embodiments.

Further preferred embodiments relate to a computer program PRG comprising commands that, when the program PRG is executed by a computer 202, cause said computer to perform the method according to the embodiments.

Further exemplary embodiments relate to a data carrier signal DCS that characterizes and/or transmits the computer program PRG according to the embodiments. For example, the data carrier signal DCS can be received via an optional data interface 206 of the device 200. For example, data frames DR', DR can also be transmitted (sent and/or received) via the optional data interface 206.

In further exemplary embodiments, FIG. 13, the device 200 or its functionality is implemented as a hardware circuit, for example as a pure hardware circuit.

In further exemplary embodiments, the device 200 is designed to access the receive buffer EP (FIG. 3) and therefrom, for example, to read information or data associated with a data frame DR' received via the bus system 10 and/or with a CAN FD LLC data frame that can, for example, be derived therefrom, and, for example, to convert this information or these data to output data according to exemplary embodiments, i.e., for example, into a bit vector BV of the type mentioned above by way of example, for example, BV-A and/or BV-B, and/or BV-C.

Further exemplary embodiments, FIG. 3, relate to a bus device 12*b* for a bus system 10, for example of the CAN FD type, comprising at least one device 200 according to the embodiments. In further exemplary embodiments, the bus device 12*b* can be designed to process, at least, for example, selectively, data frames of the CAN FD type and also data frames of the CAN XL type.

Further exemplary embodiments, FIG. 3, relate to a bus system 10, for example of the CAN FD type, comprising at least one device 200 according to the embodiments and/or comprising at least one bus device 12*b*.

The principle according to exemplary embodiments makes it possible to convert, for example transform, information in a, for example, received data frame DR', DR into a bit vector BV, which can be supplied, for example, to the device 20 as input data, for example as an input vector.

The principle according to exemplary embodiments makes possible a, for example, optimized structure, for example formatting, of the bit vector BV, for example with respect to a processing of data or information in the bit vector BV by the device 20, wherein in further exemplary embodiments, for example, different variants BV-A (FIG. 15), BV-B (FIG. 16), BV-C (FIG. 17) are possible.

For example, in further exemplary embodiments, the device 200 can be designed to output the bit vector BV selectively in at least one of the formats BV-A (FIG. 15), BV-B (FIG. 16), BV-C (FIG. 17).

An optional truncation 150, 150*a* (see FIG. 12) of a checksum ICV increases the flexibility in further embodiments.

The principle according to exemplary embodiments makes possible, for example, an efficient use of the CANsec protocol with, for example, CAN FD-compatible bus devices or bus systems, for example an efficient use of the CANsec protocol using CAN FD data frames, for example CAN FD LLC data frames.

The principle according to exemplary embodiments makes possible, for example, a uniform architecture of components and, for example, even a reduction in a code size of computer programs PRG, PRG' for processing data associated with the CANsec protocol, for example regardless of whether CAN FD and/or CAN XL is used, whereby, for example, attack possibilities on implementations of the device 200 are also reduced.

The principle according to exemplary embodiments makes possible efficient "handling," for example processing, not only of CAN FD data frames with an 11-bit identifier ("base IDs") but also of CAN FD data frames with a 29-bit identifier ("extended IDs").

If, for example, a bus device 12*b* (FIG. 3) is to be used, for example only, for processing CAN FD data frames (and, for example, not for processing CAN XL data frames), a hardware acceleration possibly present for processing the CANsec protocol can nevertheless be efficiently used using the bit vector BV, BV-A, BV-B. BV-C.

Figure 14:
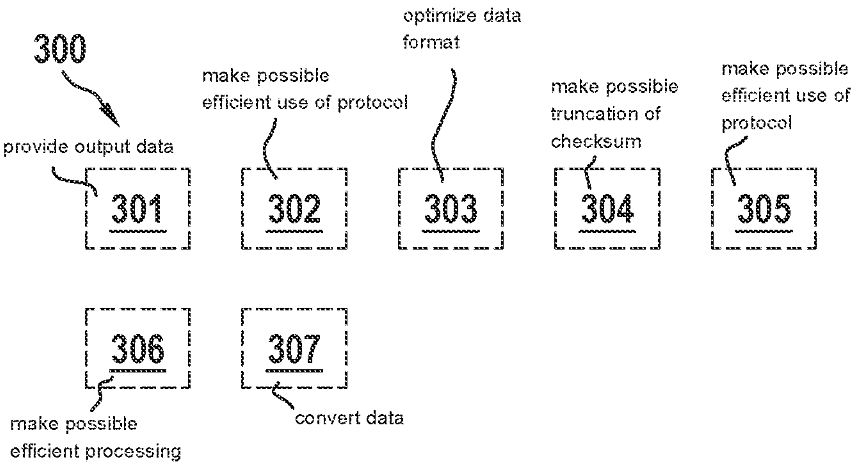
FIG. 14 schematically shows aspects of uses according to exemplary embodiments of the present invention.

Further exemplary embodiments, FIG. 14, relate to a use 300 of the method according to the embodiments and/or of the device 200 according to the embodiments and/or of the bus device 12*b* according to the embodiments and/or of the computer-readable storage medium SM according to the embodiments and/or of the computer program PRG, PRG' according to the embodiments and/or of the data carrier signal DCS according to the embodiments for at least one of the following elements: a) providing 301 output data AD with a plurality of information elements IE-1, IE-2, . . . , for example in the form of a bit vector BV, BV-A, BV-B, BV-C, for a device 20 for executing cryptographic functions (for example, "crypto engine"); b) making possible 302 an efficient use of the CANsec protocol for CAN FD; c) optimizing 303 a data format for an input vector for a device 20 for executing cryptographic functions; d) making possible 304 a truncation 150 of a checksum, for example for CAN FD, for example to a length of less than 64 bits; e) making possible 305 *a*, for example efficient, use of the CANsec protocol selectively for CAN FD and/or CAN XL; f) making possible 306 *a*, for example efficient, processing of the CANsec protocol selectively for CAN FD and/or CAN XL; f) making possible 306 *a*, for example efficient, processing of different CAN FD identifier lengths of, for example, 11 bits and 29 bits; g) converting 307, for example flexibly converting, data associated with the data frame, to at least one input bit vector BV, BV-A, BV-B, BV-C for a device 20 for executing cryptographic functions.

What is claimed is:

1. A computer-implemented method for processing data associated with a data frame that can be transmitted and/or has been transmitted via a bus system, the method comprising the following steps:

receiving, by a receiving bus device, a received data frame transferred via the bus system, wherein the received data frame is associated with a medium access control (MAC) layer;

storing the received data frame in a receive buffer associated with the receiving bus device;

providing output data with a plurality of information elements as a bit vector, wherein;

the output data are formed based on information read from the receive buffer;

a first information element of the plurality of information elements has a length of 11 bits and characterizes first identification information associated with the data frame, wherein a second information element of the plurality of information elements has a length of 18 bits and is configured to characterize optional second identification information associated with the data frame;

the output data are formed based on the first identification information, the second identification information, and at least a part of further information present in the received data frame and stored in the receive buffer;

assigning a zero value to the second information element when the data frame has a base data frame format; and assigning a non-vanishing value to the second information element based on an identification extension when the data frame has an extended data frame format; and transferring the bit vector via a data interface between the receiving bus device and a device configured to execute cryptographic functions.

2. The method according to claim 1, further comprising using the output data.

3. The method according to claim 1, wherein the data frame is a link layer control (LLC) data frame according to CAN FD controller area network flexible data rate (CAN FD) protocol according to ISO 11898-1:2015.

4. The method according to claim 1, further comprising at least one of the following elements: a) providing the first information element in the first 11 bits of the bit vector including bit 0 to bit 10; b) providing a third information element having three bits which characterizes a format of the data frame in bit 11 to bit 13 of the bit vector; c) providing the second information element in bit 14 to bit 31 of the bit vector.

5. The method according to claim 1, further comprising at least one of the following elements: a) providing filler data in bit 32 to bit 38 of the bit vector; b) providing an information element including data length code (DLC) information element, which characterizes a length of data bytes of the data frame in bit 33 to bit 42 of the bit vector; c) providing a bit rate switch (BRS) information element, which characterizes a switching of a data rate within the data frame in bit 43 of the bit vector; d) providing filler data in bit 44 to bit 63 of the bit vector.

6. The method according to claim 1, further comprising at least one of the following elements: a) providing a bit rate switch (BRS) information element, which characterizes a switching of a data rate, within the data frame in bit 32 of the bit vector; b) providing a data length code (DLC) information element which characterizes a length of data bytes of the data frame in bit 33 to bit 36 of the bit vector; c) providing filler data in bit 37 to bit 63 of the bit vector.

7. The method according to claim 1, further comprising at least one of the following elements: a) providing the first information element in the first 11 bits of the bit vector from bit 0 to bit 10; b) providing a third information element having three bits, which characterizes a format of the data frame, in bit 11 to bit 13 of the bit vector; c) providing the second information element in bit 46 to bit 63 of the bit vector.

8. The method according to claim 7, further comprising at least one of the following elements: a) providing filler data in bit 14 to bit 30 of the bit vector; b) providing a data length code (DLC) information element, which characterizes a length of data bytes of the data frame, in bit 31 to bit 34 of the bit vector; c) providing a bit rate switch (BRS) information element, which characterizes a switching of a data rate within the data frame, in bit 35 of the bit vector; d) providing filler data in bit 36 to bit 45 of the bit vector.

9. The method according to claim 1, further comprising at least one of the following elements: a) providing 32-bit filler data in bit 64 to bit 95 of the bit vector in a third 32-bit data word of the bit vector; b) providing 27-bit filler data, wherein b1) the 27-bit filler data extend from bit 32 to bit 38 and from bit 44 to bit 63, or b2) the 27-bit filler data extend from bit 37 to bit 63, or b3) the 27-bit filler data extend from bit 14 to bit 30 and from bit 36 to bit 45.

10. The method according to claim 1, further comprising: providing one or more information elements for a security protocol associated with the data frame of a CANsec type according to CiA (CAN in Automation) 613-2 specification, from bit 64 or from bit 96 of the bit vector.

11. The method according to claim 1, further comprising: providing a checksum of an integrity check value (ICV) type at an end of the bit vector.

12. The method according to claim 1, further comprising: truncating a checksum of an integrity check value (ICV) type, wherein a truncated checksum is obtained, and providing the truncated checksum at the end of the bit vector.

13. The method according to claim 12, wherein the truncating includes truncating the checksum to a length which is an integer multiple of 8 bits.

14. A device configured to process data associated with a data frame that can be transmitted and/or has been transmitted via a bus system, the device configured to:
- receive a received data frame transferred via the bus system, wherein the received data frame is associated with a medium access control (MAC) layer;
- store the received data frame in a receive buffer associated with the receiving bus device;
- provide output data with a plurality of information elements as a bit vector, wherein:
  - the output data are formed based on information read from the receive buffer;
  - a first information element of the plurality of information elements has a length of 11 bits and characterizes first identification information associated with the data frame, wherein a second information element of the plurality of information elements has a length of 18 bits and is configured to characterize optional second identification information associated with the data frame;
  - the output data are formed based on the first identification information, the second identification information, and at least a part of further information present in the received data frame and stored in the receive buffer;
  - assign a zero value to the second information element when the data frame has a base data frame format; and
  - assign a non-vanishing value to the second information element based on an identification extension when the data frame has an extended data frame format; and
- transfer the bit vector via a data interface between the receiving bus device and a device configured to execute cryptographic functions.

15. The device according to claim 14, wherein the device is used for at least one of the following elements: a) providing the output data with the plurality of information elements in the form of the bit vector for the device configured to execute cryptographic functions; b) making possible an efficient use of a CANsec protocol for CAN FD; c) optimizing a data format for an input vector for the device configured to execute cryptographic functions; d) making possible a truncation of a checksum to a length of less than 64 bits; e) making possible use of a CANsec protocol selectively for CAN FD and/or CAN XL; f) making possible an efficient processing of different CAN FD identifier lengths of 11 bits and 29 bits; g) flexibly converting data associated with the data frame into at least one input bit vector for the device configured to execute cryptographic functions.

16. A bus device for a bus system, comprising:
- at least one device configured to process data associated with a data frame that can be transmitted and/or has been transmitted via a bus system, each of the at least one device configured to:
  - receive, by a receiving bus device, a received data frame transferred via the bus system, wherein the received data frame is associated with a medium access control (MAC) layer;
  - store the received data frame in a receive buffer associated with the receiving bus device;
  - provide output data with a plurality of information elements as a bit vector, wherein;
  - the output data are formed based on information read from the receive buffer;
  - a first information element of the plurality of information elements has a length of 11 bits and characterizes first identification information associated with the data frame, wherein a second information element of the plurality of information elements has a length of 18 bits and is configured to characterize optional second identification information associated with the data frame;
  - the output data are formed based on the first identification information, the second identification information, and at least a part of further information present in the received data frame and stored in the receive buffer;
  - assign a zero value to the second information element when the data frame has a base data frame format; and
  - assign a non-vanishing value to the second information element based on an identification extension when the data frame has an extended data frame format; and
- transfer the bit vector via a data interface between the receiving bus device and a device configured to execute cryptographic functions.

17. A non-transitory computer-readable storage medium on which are stored commands for processing data associated with a data frame that can be transmitted and/or has been transmitted via a bus system, the commands, when executed by a computer, causing the computer to perform the following steps:
- receiving, by a receiving bus device, a received data frame transferred via the bus system, wherein the received data frame is associated with a medium access control (MAC) layer;
- storing the received data frame in a receive buffer associated with the receiving bus device;

providing output data with a plurality of information elements as a bit vector, wherein;

the output data are formed based on information read from the receive buffer;

a first information element of the plurality of information elements has a length of 11 bits and characterizes first identification information associated with the data frame, wherein a second information element of the plurality of information elements has a length of 18 bits and is configured to characterize optional second identification information associated with the data frame;

the output data are formed based on the first identification information, the second identification information, and at least a part of further information present in the received data frame and stored in the receive buffer;

assigning a zero value to the second information element when the data frame has a base data frame format; and assigning a non-vanishing value to the second information element based on an identification extension when the data frame has an extended data frame format; and transferring the bit vector via a data interface between the receiving bus device and a device configured to execute cryptographic functions.

* * * * *